United States Patent
Sinsabaugh et al.

(10) Patent No.: US 9,893,363 B2
(45) Date of Patent: *Feb. 13, 2018

(54) HIGH SURFACE AREA FLOW BATTERY ELECTRODES

(71) Applicant: LOCKHEED MARTIN CORPORATION, Bethesda, MD (US)

(72) Inventors: Steven L. Sinsabaugh, Uniontown, OH (US); Gregory Pensero, Abingdon, MD (US); Han Liu, Lutherville-Timonium, MD (US); Lawrence P. Hetzel, Fallston, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/351,161

(22) PCT Filed: Oct. 11, 2012

(86) PCT No.: PCT/US2012/059632
§ 371 (c)(1),
(2) Date: Apr. 11, 2014

(87) PCT Pub. No.: WO2013/059056
PCT Pub. Date: Apr. 25, 2013

(65) Prior Publication Data
US 2014/0255746 A1 Sep. 11, 2014

Related U.S. Application Data

(63) Continuation-in-part of application No. 13/274,495, filed on Oct. 17, 2011, now Pat. No. 8,822,057.

(51) Int. Cl.
*H01M 8/18* (2006.01)
*H01M 4/86* (2006.01)
(Continued)

(52) U.S. Cl.
CPC .......... *H01M 4/8626* (2013.01); *H01M 4/96* (2013.01); *H01M 8/0228* (2013.01);
(Continued)

(58) Field of Classification Search
CPC ........ H01M 8/18; H01M 8/20; H01M 8/0228; H01M 8/188; H01M 4/8626; H01M 4/36;
(Continued)

(56) References Cited

U.S. PATENT DOCUMENTS 6,787,259 B2    9/2004   Colborn et al. ................ 429/23
6,911,276 B2 *  6/2005   Extrand ............. H01M 8/0247
                                                    429/458
(Continued)

FOREIGN PATENT DOCUMENTS

EP    2560228 A1    2/2013
JP    S60-253163 A  12/1985
(Continued)

OTHER PUBLICATIONS

International Search Report mailed Dec. 6, 2012 in corresponding application No. PCT/US2012/059632.
(Continued)

*Primary Examiner* — Alex Usyatinsky
(74) *Attorney, Agent, or Firm* — Withrow & Terranova, PLLC

(57) ABSTRACT

A flow cell battery includes at least one anode compartment and at least one cathode compartment, with a separator membrane disposed between each anode compartment and each cathode compartment. Each anode compartment and cathode compartment includes a bipolar plate, a fluid electrolyte, and at least a carbon nanomaterial on the surface of the bipolar plate, wherein the fluid electrolyte flows around the carbon nanomaterial.

11 Claims, 3 Drawing Sheets

(51) Int. Cl.
H01M 8/0228 (2016.01)
H01M 8/20 (2006.01)
H01M 8/0234 (2016.01)
H01M 4/96 (2006.01)
H01M 4/36 (2006.01)
H01M 4/48 (2010.01)

(52) U.S. Cl.
CPC ......... *H01M 8/0234* (2013.01); *H01M 8/188* (2013.01); *H01M 8/20* (2013.01); *H01M 4/36* (2013.01); *H01M 4/48* (2013.01); *H01M 8/18* (2013.01); *H01M 2250/10* (2013.01); *Y02B 90/14* (2013.01); *Y02E 60/528* (2013.01)

(58) Field of Classification Search
CPC ........ H01M 4/96; H01M 4/48; H01M 8/0234; H01M 2250/10; Y02E 60/528; Y02E 90/14

See application file for complete search history.

(56) References Cited

U.S. PATENT DOCUMENTS

| | | | |
|---|---|---|---|
| 7,309,540 | B2 | 12/2007 | Wang .............................. 429/33 |
| 8,158,217 | B2 | 4/2012 | Shah et al. .................... 427/577 |
| 8,168,291 | B2 | 5/2012 | Shah et al. ................. 428/293.4 |
| 8,822,057 | B2 * | 9/2014 | Sinsabaugh ........... H01M 8/188 429/101 |
| 2005/0260473 | A1 * | 11/2005 | Wang ..................... B82Y 30/00 429/492 |
| 2006/0269827 | A1 | 11/2006 | Liu et al. ......................... 429/44 |
| 2008/0149900 | A1 * | 6/2008 | Jang ....................... H01B 1/122 252/511 |
| 2008/0160180 | A1 | 7/2008 | Debe .............................. 427/115 |
| 2008/0268318 | A1 * | 10/2008 | Jang .................... H01M 8/0206 429/492 |
| 2008/0299439 | A1 | 12/2008 | Wang .............................. 429/34 |
| 2009/0081441 | A1 | 3/2009 | Shah et al. .................... 428/222 |
| 2009/0169996 | A1 * | 7/2009 | Zhamu ...................... D01F 9/21 429/221 |
| 2009/0208807 | A1 | 8/2009 | Miyachi et al. ................ 429/33 |
| 2010/0003545 | A1 | 1/2010 | Horne et al. .................... 429/12 |
| 2010/0047671 | A1 | 2/2010 | Chiang et al. .................. 429/50 |
| 2010/0330419 | A1 * | 12/2010 | Cui .......................... H01M 4/04 429/209 |
| 2011/0124253 | A1 | 5/2011 | Shah et al. ....................... 442/60 |
| 2011/0244367 | A1 | 10/2011 | Watahiki et al. |
| 2012/0045680 | A1 | 2/2012 | Dong et al. ................... 429/109 |
| 2012/0219881 | A1 | 8/2012 | Sivarajan ...................... 429/505 |
| 2013/0045400 | A1 * | 2/2013 | Dong ............... H01M 8/04186 429/51 |

FOREIGN PATENT DOCUMENTS

| | | | |
|---|---|---|---|
| WO | WO 2010/005954 | * | 1/2010 |
| WO | WO 2010/144457 | A2 * | 12/2010 |
| WO | 2011111717 | A1 | 9/2011 |

OTHER PUBLICATIONS

Written Opinion mailed Dec. 6, 2012 in corresponding application No. PCT/US2012/059632.
*Components for Flow Batteries*—SGL Group; The Carbon Company; May 2011.
*Multi-walled Carbon Nanotubes Electrodes for the All Vanadium Redox Flow Battery*; Lin et al.; 2009; Energy and Environment Laboratories Industrial research Institute; Taiwan; Department of Energy and Resources; National United University; Taiwan.
*Electromechanical investigation of polyhalide ion oxidation-reduction on carbon nanotube electrodes for redox flow batteries*; Shao et al; Electrochemistry Communications; 11; Sep. 2009; pp. 2064-2067.
*Electrochemical characterisation of activated carbon particles used in redox flow battery electrodes*; Radford et al; Journal of Power Sciences 185; Aug. 2008; pp. 1499-1504.
*Highly hydroxylated carbon fibres as electrode materials of all-vanadium redox flow battery*; Yue et al; ScienceDirect; Carbon 48; May 2010; pp. 3079-3090.
*Nitrogen-dopes mesoporous carbon for energy storage in vanadium redox flow batteries*; Shao et al.; Journal of Power Sources 195; Jan. 2010; pp. 4375-4379.
Office Action mailed Jun. 13, 2013 in corresponding U.S. Appl. No. 13/274,495.
Response filed Sep. 26, 2013 in corresponding U.S. Appl. No. 13/274,495.
Office Action mailed Oct. 24, 2013 in corresponding U.S. Appl. No. 13/274,495.
Response and all documents submitted therewith filed Jan. 24, 2014 in corresponding U.S. Appl. No. 13/274,495.
Office Action mailed Feb. 19, 2014 in corresponding U.S. Appl. No. 13/274,495.
Response and all documents submitted therewith filed May 19, 2014 in corresponding U.S. Appl. No. 13/274,495.
Notice of Allowance mailed Jun. 11, 2014 in corresponding U.S. Appl. No. 13/274,495.
*Multi-walled carbon nanotubes used as an electrode reaction catalyst for $VO_2^+/VO^{2+}$ for a vanadium redox flow battery*; Li (Yan) et al.; Carbon 49 (2011) 3463-3470.
International Preliminary Report on Patentability for PCT/US2012/059632, mailed May 1, 2014, 7 pages.
Non-Final Office Action for U.S. Appl. No. 13/274,495, mailed Jun. 27, 2013, 19 pages.
First Office Action for Chinese Patent Application No. 201280050714.2, mailed Sep. 2, 2015, 9 pages.
Office Action and Search Report for Taiwanese Patent Application No. 101137933, dated Feb. 17, 2016, 16 pages.
Second Office Action for Chinese Patent Application No. 201280050714.2, dated May 16, 2016, 9 pages.
Notice of Reasons for Rejection for Japanese Patent Application No. 2014-537119, dated Feb. 10, 2017, 11 pages.
Third Office Action for Chinese Patent Application No. 201280050714.2, dated Jan. 20, 2017, 12 pages.
Decision of Rejection for Japanese Patent Application No. 2014-537119, dated May 23, 2017, 5 pages.
Notification of Reasons for Rejection for Japanese Patent Application No. 2014-537119, dated Jun. 21, 2016, 4 pages.
Notice of Eligibility for Grant and Supplementary Examination Report for Singapore Patent Application No. 11201401408X, dated Jun. 20, 2016, 3 pages.
Fourth Office Action and Search Report for Chinese Patent Application No. 201280050714.2, dated Aug. 17, 2017, 10 pages.
Examination Report for European Patent Application No. 12775418.2, dated Oct. 20, 2017, 5 pages.

* cited by examiner

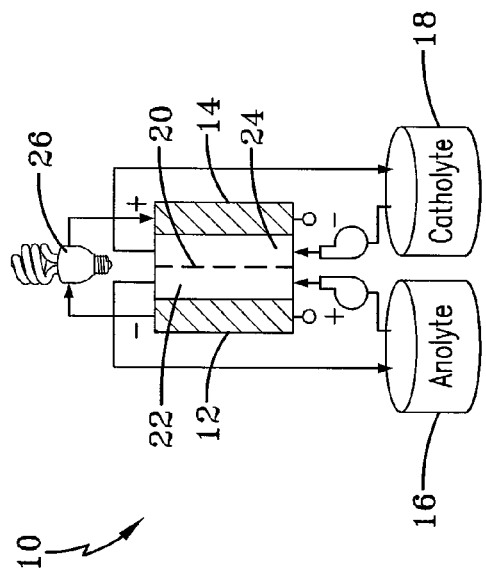
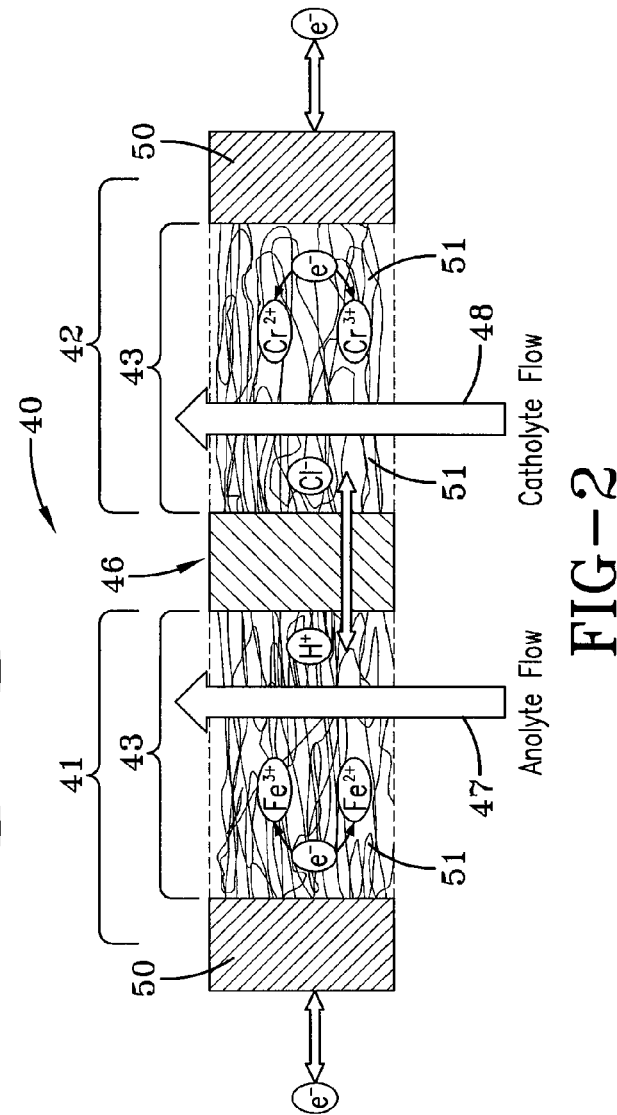
FIG-1 PRIOR ART
FIG-2

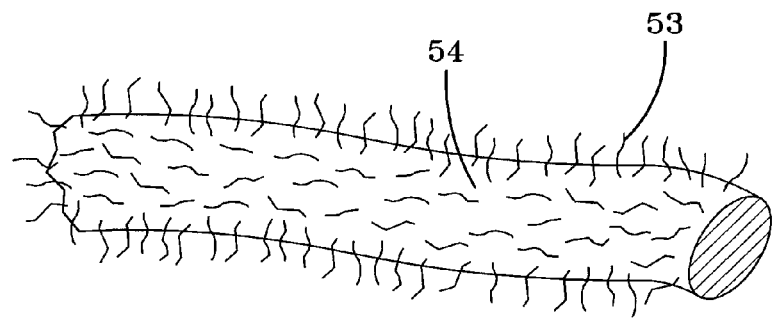
FIG-3
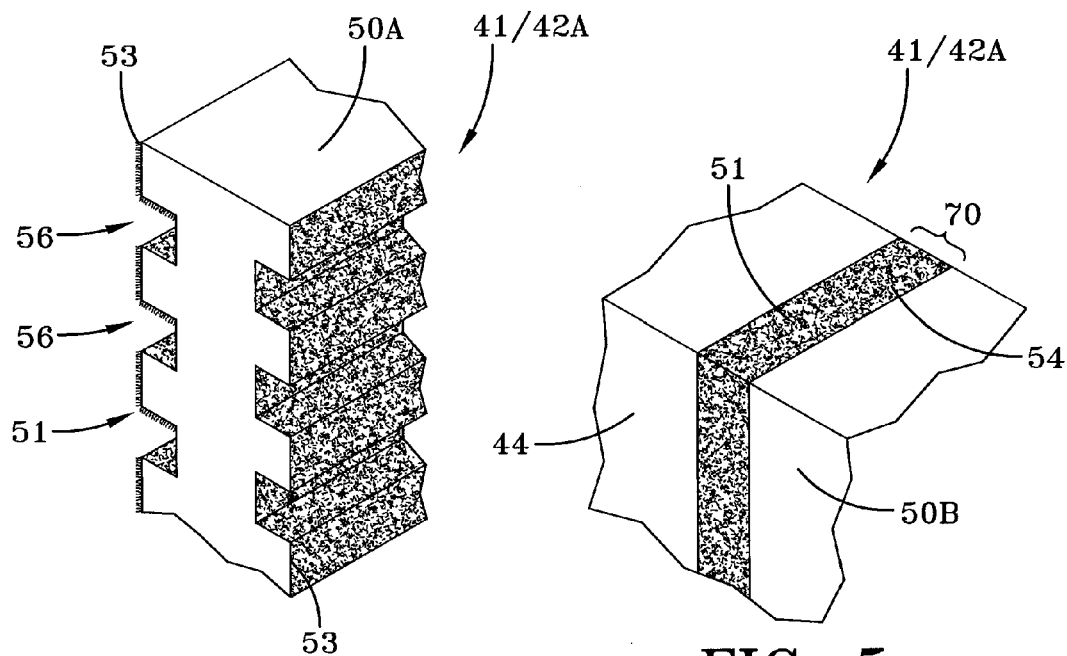
FIG-4
FIG-5

HIGH SURFACE AREA FLOW BATTERY ELECTRODES

CROSS-REFERENCE TO RELATED APPLICATIONS

This is a § 371 application of International patent application number PCT/US2012/059632 filed Oct. 11, 2012, which claims the benefit of U.S. application Ser. No. 13/274,495 filed Oct. 17, 2011, both of which are incorporated herein by reference.

TECHNICAL FIELD

Generally, the present invention is directed to large scale (1 KWh-many MWh) electrical energy storage devices. Specifically, the present invention is directed to rechargeable batteries in the form of flow batteries. In particular, the present invention is directed to improved electrode configurations for flow batteries and potentially other types of batteries.

BACKGROUND ART

With the desire to utilize "green" energy and renewable energy sources, there is a desire to incorporate these intermittent types of energy sources into the power grid. Intermittent sources include, but are not limited to wind, solar, photovoltaics and wave power. For example, if winds are not present, the wind turbines do not generate electrical energy; however, when they do produce energy, the current electrical grid cannot always handle large quantities of the energy produced. Grid connected energy storage devices would enable capturing excess energy from these intermittent renewable energy sources, and releasing the stored energy on the grid when it is needed. This combination of renewable energy sources and grid energy storage would support energy independence, reduced emissions and renewable energy sources. There is also a need for reliable grid energy storage devices so as to relieve transmission congestion, allow for energy price arbitrage, and improve the overall quality of the power grid.

It is believed that flow batteries are a viable solution for creating and improving grid storage. Flow batteries can potentially provide efficient modular energy storage while providing a low cost. They can be independently operated and provide adequate energy and power ratings by utilizing replenishable-liquid reactants and have low cycling impacts and a long life. Flow batteries also have other uses as it relates to microgrid or small power systems and for use as backup power supplies. However, the cost of these systems has prevented wide-scale deployment. A major portion of the system cost is in the flow battery cell stack and the associated anolyte and catholyte. To a large extent, the stack costs are limited by the current density that can be put through the cell stack. A higher current density enables more power to be generated in a given cell stack and effectively decreases the cost per watt. But with current state of art low surface area electrode, higher current density will lead to higher energy loss which increases operational cost. Thus, the electrodes need to have a much greater electroactive surface area, while still managing to minimize cost. Current flow battery systems use carbon-based materials, such as carbon felts, for the electrodes.

Referring to FIG. 1, it can be seen that a known flow battery configuration is designated generally by the numeral 10. The battery 10 is provided in a single cell configuration but skilled artisans will appreciate that multiple cells can be incorporated into a stack, and multiple stacks can be employed. In any event, a flow battery comprises an anode 12 and a cathode 14, both of which are referred to as electrodes. An anolyte tank 16 and a catholyte tank 18 direct respective fluid materials through an anode flow area 22 and a cathode flow area 24. A separator membrane 20 is used to separate the anolyte flow area 22 from the catholyte flow area 24 while allowing ion exchange between the two flow areas. As these materials flow through their respective channels, electrical power is generated by redox reactions, in which electrons are drawn through an external electric load 26 as schematically represented by a light bulb.

Skilled artisans will appreciate that the flow battery is a rechargeable battery in which anolyte and catholyte containing one or more dissolved electroactive species flows through the electrochemical cell that converts the chemical energy directly into electricity. Flow batteries can be recharged by re-flowing the electrolyte liquids through the flow areas as an external electrical power source is applied to the electrodes, effectively reversing the electrical generation reactions. The flow battery is advantageous in that the reaction of active species in the electrolyte permits external storage of reactants, thereby allowing independent scale up of power and energy density specifications. Moreover, the ability to externally store the reactants avoids self-discharge that is observed in other primary and secondary battery systems. As such, the energy is effectively stored in the anolyte and catholyte tanks until needed by the load.

Various chemistries are utilized in the operation of flow cell batteries. In particular, different types of anolyte and catholyte materials may be utilized. For example, the zinc bromine system may be utilized wherein zinc plating is maintained in the cell stack. These types of configurations utilize high efficiency and low cost reactants. Vanadium redox technology may also be utilized. This provides high efficiency but low energy density. There is minimal risk of cross-contamination between the materials, however the vanadium is an expensive material and the pentoxide utilized is considered a hazard after it is no longer usable. Another type of flow battery utilizes iron-chrome. Its advantage is in the use of low cost reactants, however it currently only provides for smaller type systems in comparison to the zinc-bromine or vanadium redox embodiments. There are additional chemical couples that could be utilized in a flow battery configuration.

Flow batteries typically use carbon felt electrodes. This kind of configuration is advantageous in that the carbon electrodes are chemically compatible with the typical anolyte and catholyte solutions and provide relatively high surface area and good electrical conductivity. The carbon felt provides for a high number of reaction sites and is a discrete component that is sandwiched or disposed between the bipolar plates, which are typically a solid carbon or conductive polymer material, and the membrane separator. The carbon felts are directly in contact with the bipolar plate. Other materials that can be used for the electrodes are carbon or graphite particles that are embedded directly into the bipolar plates. The significant drawback of the carbon felt electrodes is that it limits the desired current density. In particular, the current densities are believed to be limited by the lack of surface area and the density of electroactive reaction sites.

Therefore, there is a need in the art for flow batteries which utilize electrodes that have improved surface areas so as to allow for a higher density of reaction sites and, thus, the ability to store and generate higher power output. There is also the need to provide such an improved electrode that minimizes system level cost.

SUMMARY OF THE INVENTION

In light of the foregoing, it is a first aspect of the present invention to provide high surface area flow battery electrodes.

Another aspect of the present invention is to provide a flow cell battery, comprising at least one anode compartment, at least one cathode compartment, a separator membrane disposed between each anode compartment and cathode compartment, each anode compartment and cathode compartment comprising a bipolar plate, fluid electrolyte and at least a carbon nanomaterial on the surface of the bipolar plate, wherein the fluid electrolyte flows around the carbon nanomaterial positioned proximally at least one side of the bipolar plate.

Yet another aspect of the present invention is a flow battery electrode utilized in a flow battery, wherein the flow battery electrode is maintained in either an anode or cathode compartment of a flow battery, wherein the compartment includes a bipolar plate adjacent a flow channel through which electrolyte flows, the flow battery electrode comprises a porous carbon nanomaterial structure adjacent the bipolar plate, wherein the porous carbon nanomaterial structure comprises either woven or non-woven filaments or a combination thereof.

Still another aspect of the present invention is to provide a method for constructing a flow cell battery comprising providing at least one anode compartment, providing at least one cathode compartment, disposing a separator membrane between each at least one anode compartment and each at least one cathode compartment, and providing each compartment with a bipolar plate and at least a carbon nanomaterial disposed on a surface of the bipolar plate, each compartment having a flow channel into which the carbon nanomaterial extends into the flow channel so that fluid electrolyte flows around nanomaterial.

BRIEF DESCRIPTION OF THE DRAWINGS

This and other features and advantages of the present invention will become better understood with regard to the following description, appended claims, and accompanying drawings wherein:

FIG. 1 is a schematic diagram of a prior art flow battery;

FIG. 2 is an enlarged detailed schematic diagram of a flow cell made in accordance with the concepts of the present invention; and FIG. 3 is an enlarged schematic diagram of a carbon fiber with carbon nanomaterial extending from its surface;

FIG. 4 is a partial schematic perspective representation of a bipolar plate with a covering of carbon nanomaterial according to the concepts of the present invention;

FIG. 5 is an enlarged schematic representation of a carbon felt infused with carbon nanomaterial according to the concepts of the present invention;

BEST MODE FOR CARRYING OUT THE INVENTION

Figure 6:
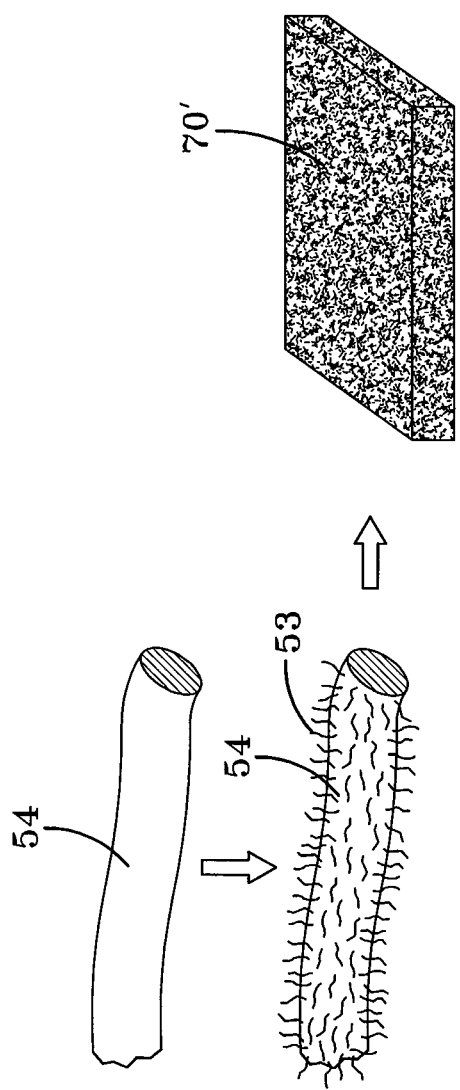
FIG. 6 schematically shows one method of forming a carbon felt infused with carbon nanomaterial according to the concepts of the present invention.

Referring now to FIG. 2, it can be seen that a cell is designated generally by the numeral 40. The cell 40 may be provided in a single configuration or multiple cells may be stacked adjacent one another and utilized to operate as a flow cell battery. Each cell 40 provides at least one anode compartment 41 and at least one cathode compartment 42. When multiple compartments are provided in a cell 40, the anode compartments 41 are interleaved with the cathode compartments 42. Each compartment 41/42 includes a flow channel 43, wherein each flow channel has associated therewith an electrode which is either an anode or a cathode. As will become apparent as the description proceeds, each anode/cathode compartment 41/42 functions as an electrode that enables the flow of electrons to enable storage of electrical energy generated by a source or delivery of electrons to an electrical load.

The two flow channels are divided by a separator membrane 46 which is centrally disposed between each compartment or electrode and allows for ionic conductivity between an anolyte flow 47 and a catholyte flow 48. In the present embodiment, the separator membrane 46 allows ionic current flow via $H^+$ and/or $Cl^-$ species or the like, while preventing migration of the redox species such as, but not limited to, $Fe^{2+}$ $Fe^{3+}$, $Cr^{2+}$ $Cr^{3+}$, $V^{2+}/V^{3+}/$ $V^{4+}/V^{5+}$ and $Ce^{3+}/Ce^{4+}$ or the like. Each cell 40 is contained within a pair of bipolar plates 50 which are electrically conductive. In particular, each compartment 41/42 has associated therewith a bipolar plate 50. It will be appreciated that the bipolar plates are current collectors connected in a bipolar topology. The bipolar plate or current collector prevents any mass transfer between adjacent flow regions while maintaining electrical continuity between each cell. Those skilled in the art will recognize that for a multiple cell configuration, bipolar plates will be shared between cells. Disposed between the bipolar plate and the respective membrane is a porous material 51 which is part of each compartment 41/42. The material 51, in conjunction with the adjacent bipolar plate, function as high surface area electrodes with catalyst sites where electrons from the bipolar plate 50 can reach the redox species of the anolyte and catholyte fluids flowing through the adjacent flow channels 43.

In order to maximize the number of catalyst sites, the filler material comprises nanomaterials and, specifically, carbon nanomaterials. As used herein, carbon nanomaterials include, but are not limited to, carbon nanotubes, carbon nanostructures and combinations thereof in any ratio. Generally, as used herein, the term "carbon nanotube" (CNT, plural CNTs) refers to any of a number of cylindrically-shaped allotropes of carbon of the fullerene family including single-walled carbon nanotubes (SWNTs), double-walled carbon nanotubes (DWNTs), multi-walled carbon nanotubes (MWNTs). CNTs can be capped by a fullerene-like structure or open-ended. CNTs include those that encapsulate other materials. CNTs appear in branched networks, entangled networks, and combinations thereof. The CNTs prepared on the substrate as the CNS structure can include individual CNT motifs from exclusive MWNTs, SWNTs, or DWNTs or the CNS can include mixtures of CNT these motifs. As used herein, carbon nanostructures (CNS) comprise a polymer-like structure comprising carbon nanotubes (CNTs) as a monomer unit, the CNS comprising a highly entangled carbon nanotube-based web-like structure that includes combinations of CNTs that are interdigitated, branched, crosslinked, and share common walls. Indeed, the carbon nanostructures disclosed herein comprise carbon nanotubes (CNTs) in a network having a complex morphology. Without being bound by theory, it has been indicated that this complex morphology may be the result of the preparation of the CNS network on a substrate under CNT growth conditions at a rapid rate on the order of several microns per second. This rapid CNT growth rate coupled with the close proximity of the nascent CNTs may provide the observed branching, crosslinking, and shared wall motifs. For simplicity, the following discussion may refer to the CNS disposed on the substrate, filament or fiber interchangeably as CNTs because CNTs comprise the major structural component of the CNS network. Carbon nanostructures also refer to any carbon allotropic structure having at least one dimension in the nanoscale. nanoscale dimensions include any dimension ranging from between 0.1 nm to about 1000 nm. Formation of such structures can be found in U.S. Publication No. 2011/0124253, which is hereby incorporated by reference.

The porous filler material 51 sometimes may include a felt made up of filaments which may be a woven or non-woven carbon, graphite or like material, wherein the felt carries or is infused with the above-described carbon nanomaterial. The materials 51 typically provide excellent chemical resistance and inert properties with high porosity and good electrical conductivity. In some embodiments if woven porous filler material is used, the resulting structure may use two-dimensional weaving patterns, three dimensional weaving patterns, or combinations thereof. In embodiments where non-woven porous filler material is used, those materials can be fabricated by hydroentanglement, electrostatic flocking, standard flocking, air lay methods, wet lay methods and any combination thereof. In some embodiments the filaments in the woven or non-woven material may be infused with the carbon nanotubes or nanostructures, without carbon nanostructures, or combinations thereof, in any ratio found effective. Moreover, in any embodiment, the filaments utilized in either woven or non-woven embodiments may be constructed from metals, metal oxides, carbon, glass, polymers, metalized carbon, metalized glass, metalized polymer and any combination thereof. Additionally, in some embodiments, the carbon nanostructures are infused to the filaments by direct growth or by submersion into a carbon nanostructure dispersion.

Generally, all of the embodiments described herein provide for application of a low production cost method of modifying the bipolar plate, or an associated electrode, directly or indirectly, with some associated material enhanced with carbon nanomaterial. In other words, carbon nanomaterial is positioned proximally on at least one side of the bipolar plate or current collector. This could be done by placing the nanomaterial proximally adjacent the plate, or infusing directly/coating/growing the nanomaterial on the plate, or coating the associated electrode. These porous carbon nanomaterial placements or coatings provide up to several orders of magnitude greater active surface area than carbon felt, thereby enabling higher current density through the system. The modified bipolar plates provide a conductive region that extends fully between one side of the bipolar plate and the adjacent separator membrane. It is believed that the key to achieve reduced costs is the ability to apply these carbon nanomaterial variations at a low cost. Skilled artisans will appreciate that the carbon nanomaterial is grown in such a manner that the nanomaterial generally extends substantially perpendicularly, or randomly, or in any angular orientation from a surface. For example, as schematically shown in FIG. 3, carbon nanotubes 53 are shown extending radially from a carbon fiber 54. The number or density of nanotubes or other nanostructures extending from a surface may be varied as appropriate. Additionally, the nanotubes or other nanostructures may be grown to extend from any shape surface—planar, curved, spherical, ridged, and so on. The tubes or structures may be strictly parallel with each other, form in a radial arrangement or entangled in a mesh.

In a first embodiment shown in FIG. 4, it can be seen that a compartment 41/42A comprises a bipolar plate 50A in which the porous filler material 51 comprises a carbon nanomaterial layer which is provided on each side of the plate. In this embodiment, the bipolar plate 50A is provided with a plurality of channels 56 so as to provide a three dimensional structure on either one or both sides of plate 50A so as to allow either the anolyte or catholyte to flow adjacent thereto. The material 51 comprises carbon nanomaterial such as carbon nanotubes 53 that are grown directly, partially or completely, onto the outer surface of the bipolar plate 50A. The nanotubes 53 are relatively much smaller than the thickness of the bipolar plate. In this embodiment, the nanotubes are aligned or oriented so as to extend primarily perpendicularly from the bipolar plate and also extend into the channels 56. In other embodiments, the carbon nanomaterial may be carbon nanostructures that extend randomly, angularly, or in defined or undefined patterns. As is understood, the plate consists of an electrically conductive material that separates the cells and is resistant to corrosion. In a variation of this embodiment, the bipolar plate could be provided without channels, as a flat surface, with the carbon nanomaterial extending substantially perpendicularly therefrom. The carbon nanomaterial could cover the entire plate surface or the nanomaterial could be selectively patterned in such a way to form flow patterns or paths for the anolyte or catholyte.

This implementation has the benefit over the current art of entirely eliminating a component, the carbon felt, in a cell since the electrode functions and bipolar plate functions are effectively integrated with one another. Prior art devices simply provided a carbon felt on either side of the bipolar plates wherein the felt provided reaction sites but wherein the reaction sites are randomly disposed about the carbon felt. In distinct contrast, the use of carbon nanotubes 53 or other carbon nanostructures in the channels 56 or on the surface as shown in FIG. 4 greatly increases the surface area though which the anolyte and catholyte fluids must flow and, as such, the fluids are exposed to a greater number of reaction sites.

Referring now to FIG. 5, it can be seen that in another embodiment a compartment 41/42B comprises a bipolar plate 50B. In this embodiment, the porous filler material 51 is a carbon nanomaterial infused felt 70, sometimes referred to as an infused fabric, that is disposed on each side of the bipolar plate and placed adjacent the respective separator membranes 44. The carbon nanomaterial infused felt is inserted into the compartment in place of the prior art carbon felt. The carbon nanomaterial infused fabric or tow provides for improved chemical resistance and electrical conductivity and, as in the previous embodiment, much higher surface area to facilitate high current densities.

Figure 7:
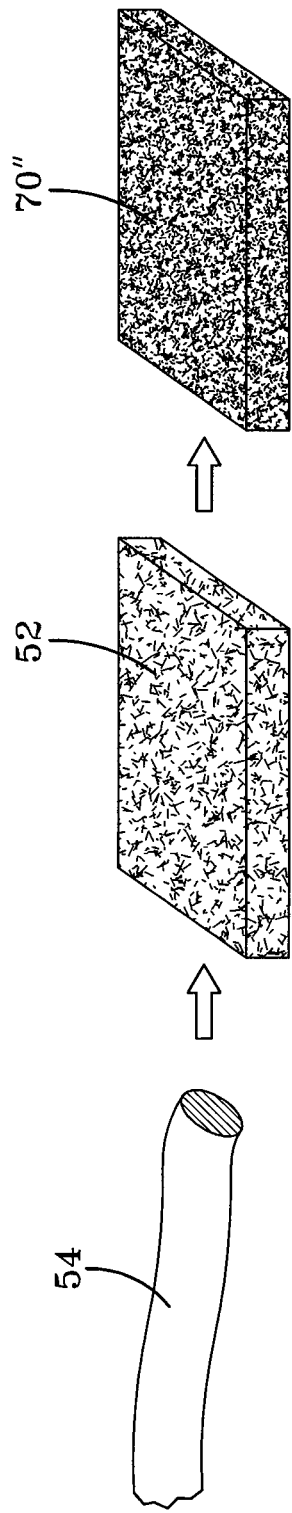
FIG. 7 schematically shows another method of forming a carbon felt infused with carbon nanomaterial according to the concepts of the present invention.

For the embodiment shown in FIG. 5, the felt 70 may be constructed in a number of ways. A first method of construction, represented in FIG. 6, is to first manufacture carbon or graphite fibers or filaments 54 and then grow carbon nanotubes 53 or other carbon nanostructures on the fibers 54. The infused fibers are then assembled to one another, either in long thread or chopped form, so as to form a non-woven carbon nanomaterial infused felt 70'. A second method of construction represented in FIG. 7 is to manufacture the filaments 54 and then form them into a non-woven felt 52. Next, the felt is processed so as to grow carbon nanotubes 53 or other carbon nanostructures directly on the filaments 54 so as to form a carbon nanomaterial infused felt 70". As noted previously, the felt 70, 70', 70" is a porous non-woven configuration with many openings and interstices. Accordingly, the nanomaterial proliferates throughout the felt and contacts the bipolar plate and membrane when those components are assembled. Multiple woven processes could also be used to fabricate a porous electrode structure from fibers or filaments. Indeed, any woven or non-woven three dimensional structure employing the nanomaterial 53 could be used.

This embodiment and the related methods of construction are advantageous in that the carbon felt in conventional flow battery stack structures is replaced by a felt that is equivalent at the macro scale, but has up to one to two orders of magnitude or greater surface area, increasing the reaction rate in the anolyte or catholyte and thus increasing the current density of the system without introduced any significant energy loss on the electrochemical reactions. In this embodiment, the carbon felt is provided in combination with the carbon nanomaterial that is easily grown on the carbon felt material.

The embodiments shown in FIGS. 4 and 5 may be implemented by treating the carbon nanomaterial-coated bipolar plates and any variation of the carbon nanomaterial with various forms of treatments such as thermal, chemical, so as to increase the number of active sites for the pertinent flow thereby allowing more redox reactions to take place. It will be appreciated that variations in the carbon nanotube or nanostructure growth processes enable the optimization of the carbon nanomaterial characteristics for redox activity, electrochemical activity, electrical conductivity and chemical resistance by controlling the nanomaterial characteristics such as the configuration of multi-walls, length, density, chirality, defects and addition of functional groups.

The disclosed configurations are advantageous in that the carbon surface area is increased by up to an order of magnitude or more over the carbon felt and other known prior art configurations. This increase in the microscopic and nanoscopic surface area increases the number of sites available for the associated flow battery anode or cathode reactions to occur. This enables the reactions to take place at a higher rate for a given macroscopic surface area, thereby enabling higher power densities in the cell stack and potentially lower cost systems due to the reduction in material costs per unit, power and energy. It is also believed that this configuration enables the cell and the complete cell stack to operate with higher round-trip efficiencies and reduces the various overpotential, resistive, and/or electrical losses in the system.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A flow cell battery, comprising:
    at least one anode compartment;
    at least one cathode compartment;
    a separator membrane disposed between each said anode compartment and cathode compartment;
    each said anode compartment and said cathode compartment comprising:
        a bipolar plate, fluid electrolyte and a carbon nanomaterial attached directly to a surface of the bipolar plate, wherein the fluid electrolyte flows through and about said carbon nanomaterial.

2. The battery according to claim 1, wherein at least one side of said bipolar plate has a plurality of channels so as to provide an embedded flow pattern.

3. The battery according to claim 2, wherein said plurality of channels are covered with said carbon nanomaterial.

4. The battery according to claim 3, wherein said carbon nanomaterial is substantially perpendicular to said bipolar plate.

5. The battery according to claim 1, wherein the anode compartment electrode function, the cathode compartment electrode function, or both, are integrated into the bipolar plate.

6. The battery according to claim 5, wherein said bipolar plate is covered by said carbon nanomaterial.

7. The battery according to claim 6, wherein said carbon nanomaterial is substantially perpendicular to said bipolar plate.

8. The battery according to claim 1, wherein said carbon nanomaterial is disposed in a pattern to form a flow pattern.

9. The battery according to claim 1, wherein said carbon nanomaterial in said anode compartment and cathode compartment extends at least partially between said bipolar plate and said adjacent separator membrane.

10. A method for constructing a flow cell battery comprising:
    providing at least one anode compartment;
    providing at least one cathode compartment;
    disposing a separator membrane between each said at least one anode compartment and each said at least one cathode compartment;
    providing each said compartment with a bipolar plate and a carbon nanomaterial attached directly to a surface of said bipolar plate, each said compartment having a flow channel into which said carbon nanomaterial extends into said flow channel so that fluid electrolyte flows through and about the carbon nanomaterial.

11. The method according to claim 10, further comprising:
    forming said carbon nanomaterial into a three dimensional structure.

* * * * *